United States Patent
Wakana et al.

(10) Patent No.: US 11,073,594 B2
(45) Date of Patent: Jul. 27, 2021

(54) POSITION ESTIMATING DEVICE, POSITION ESTIMATING SYSTEM, AND POSITION ESTIMATING METHOD

(71) Applicant: ALPS ALPINE CO., LTD., Tokyo (JP)

(72) Inventors: Keigo Wakana, Miyagi (JP); Yukimitsu Yamada, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/011,186

(22) Filed: Sep. 3, 2020

(65) Prior Publication Data
US 2020/0400775 A1 Dec. 24, 2020

Related U.S. Application Data

(63) Continuation of application No. PCT/JP2019/007376, filed on Feb. 26, 2019.

(30) Foreign Application Priority Data

Mar. 26, 2018 (JP) .............................. JP2018-058676

(51) Int. Cl.
*G01S 5/06* (2006.01)
*G01S 5/02* (2010.01)

(52) U.S. Cl.
CPC .............. *G01S 5/06* (2013.01); *G01S 5/0284* (2013.01)

(58) Field of Classification Search
CPC .... G01S 5/0205; G01S 5/0221; G01S 5/0284; G01S 5/06; G01S 5/12; G01S 2205/01;
(Continued)

(56) References Cited

U.S. PATENT DOCUMENTS 8,200,251 B2   6/2012 Huang
2007/0275658 A1*  11/2007 Gaal .................... G01S 19/423
                                                          455/12.1
(Continued)

FOREIGN PATENT DOCUMENTS

JP  2006-242751   9/2006
JP  2008-170386   7/2008
(Continued)

OTHER PUBLICATIONS

English Translation of JP 2006-242751 A (Year: 2021).*
(Continued)

*Primary Examiner* — Bernarr E Gregory
*Assistant Examiner* — Fred H Mull
(74) *Attorney, Agent, or Firm* — IPUSA, PLLC

(57) ABSTRACT

A position estimating device includes a processor, and a memory storing program instructions that cause the processor to obtain a plurality of position data of a transmitter, the plurality of position data being output from respective positioning devices, calculate a density of the plurality of position data based on the plurality of obtained position data output from the respective positioning devices, the density of the plurality of position data being a value indicating how close positions indicated by the plurality of position data are, and estimate a position of the transmitter based on the plurality of position data output from the respective positioning devices and the calculated density.

13 Claims, 8 Drawing Sheets

(58) Field of Classification Search
CPC .. G01S 19/423; G01R 33/0206; H04W 64/00; G01F 16/287
See application file for complete search history.

(56) References Cited

U.S. PATENT DOCUMENTS

| | | | |
|---|---|---|---|
| 2008/0062041 A1* | 3/2008 | Lee ..................... | G01S 19/423 342/357.29 |
| 2009/0293295 A1* | 12/2009 | Hirobe ............... | G01R 33/0206 33/356 |
| 2011/0287779 A1* | 11/2011 | Harper ................. | G01S 19/423 455/456.1 |
| 2013/0163448 A1 | 6/2013 | Ruuska | |
| 2013/0316732 A1* | 11/2013 | Thornton ............. | H04W 64/00 455/456.1 |
| 2018/0181835 A1* | 6/2018 | Fluxa Rodriguez .. | G06F 16/287 |
| 2020/0225362 A1* | 7/2020 | Mattmueller ......... | G01S 19/423 |

FOREIGN PATENT DOCUMENTS

| | | |
|---|---|---|
| JP | 2010-085290 | 4/2010 |
| JP | 2011-145128 | 7/2011 |
| JP | 2015-053678 | 3/2015 |

OTHER PUBLICATIONS

International Search Report for PCT/JP2019/007376 dated May 28, 2019.

Office Action dated Mar. 23, 2021 issued with respect to the corresponding Japanese Patent Application No. 2020-510463.

* cited by examiner

FIG.4

| ITEM | SCORE | WEIGHT VALUE | NOTES |
|---|---|---|---|
| SUM OF DISTANCES BETWEEN COORDINATES | p1 (0 TO 100) | α1 | SCORE IS HIGHER AS SUM OF DISTANCES DECREASES. |
| NUMBER OF CLOSE POINTS | p2 (0 TO 100) | α2 | 0 CLOSE POINTS: SCORE OF 0<br>1 CLOSE POINT: SCORE OF 25<br>2 CLOSE POINTS: SCORE OF 50<br>3 CLOSE POINTS: SCORE OF 75<br>SCORE IS 100 WHEN NUMBER OF CLOSE POINTS IS 4. |

FIG.5

| ITEM | SCORE | WEIGHT VALUE | NOTES |
|---|---|---|---|
| MEASUREMENT DISTANCE | p3 (0 TO 100) | $\alpha 3$ | SCORE IS HIGHER AS DISTANCE DECREASES. |
| VARIATION OF MEASUREMENT ACCURACY | p4 (0 TO 100) | $\alpha 4$ | SCORE IS HIGHER AS VARIATION DECREASES. |
| RSSI VALUE | p5 (0 TO 100) | $\alpha 5$ | SCORE IS HIGHER AS RSSI VALUE INCREASES. |
| DISTANCE DIFFERENCE FROM PREVIOUS COORDINATE | p6 (0 TO 100) | $\alpha 6$ | SCORE IS HIGHER AS DISTANCE DIFFERENCE DECREASES. |

POSITION ESTIMATING DEVICE, POSITION ESTIMATING SYSTEM, AND POSITION ESTIMATING METHOD

CROSS-REFERENCE TO RELATED APPLICATION

This application is a continuation application of International Application No. PCT/JP2019/007376 filed on Feb. 26, 2019, and designated the U.S., which is based upon and claims the benefit of priority of the prior Japanese Patent Application No. 2018-058676, filed on Mar. 26, 2018, the entire contents of which are incorporated herein by reference.

BACKGROUND OF THE INVENTION

1. Field of the Invention

The present invention relates to a position estimating device, a position estimating system, and a position estimating method.

2. Description of the Related Art

Techniques in which multiple positioning devices are used to receive radio waves from a transmitter (e.g., a radio tag) attached to an object to be positioned, to estimate a position of a transmitter (i.e., the object to be positioned) based on a received result of the radio waves, are known.

For example, Patent Document 1 below describes a technique that receives tag information including an incoming direction of a radio wave, which is received from a radio tag, from multiple positioning devices through a network, and that calculates position data of the radio tag for each received tag information based on the incoming direction included in the tag information and the position of the positioning device.

However, in the related art, positioning results of multiple positioning devices may vary due to noise superimposed on radio waves or deterioration of radio wave reception conditions, for example. In such a case, it is not possible to estimate the position of the object to be positioned with high accuracy.

Thus, it is desired that the position of the object to be positioned can be estimated with high accuracy even when positioning results obtained by multiple positioning devices vary.

RELATED-ART DOCUMENTS

[Patent Document]
Patent Document 1: Japanese Laid-Open Patent Publication No. 2010-85290

SUMMARY OF THE INVENTION

A position estimating device according to an embodiment includes a position data obtaining unit configured to obtain a plurality of position data of a transmitter, the plurality of position data being output from respective positioning devices, a density calculating unit configured to calculate a density of the plurality of position data based on the plurality of position data of the respective positioning devices obtained by the position data obtaining unit, and a position estimating unit configured to estimate a position of the transmitter based on the plurality of position data of the respective positioning devices and the density calculated by the density calculating unit.

BRIEF DESCRIPTION OF THE DRAWINGS

FIG. 4 is a drawing for describing a method of calculating the density at a density calculating unit according to the embodiment;

FIG. 5 is a drawing for describing a method of calculating the degree of reliability at a reliability calculating unit according to the embodiment;

DESCRIPTION OF THE PREFERRED EMBODIMENTS

An embodiment will be described in the following with respect to the drawings.

(System Configuration of a Position Estimating System 10)

Figure 1:
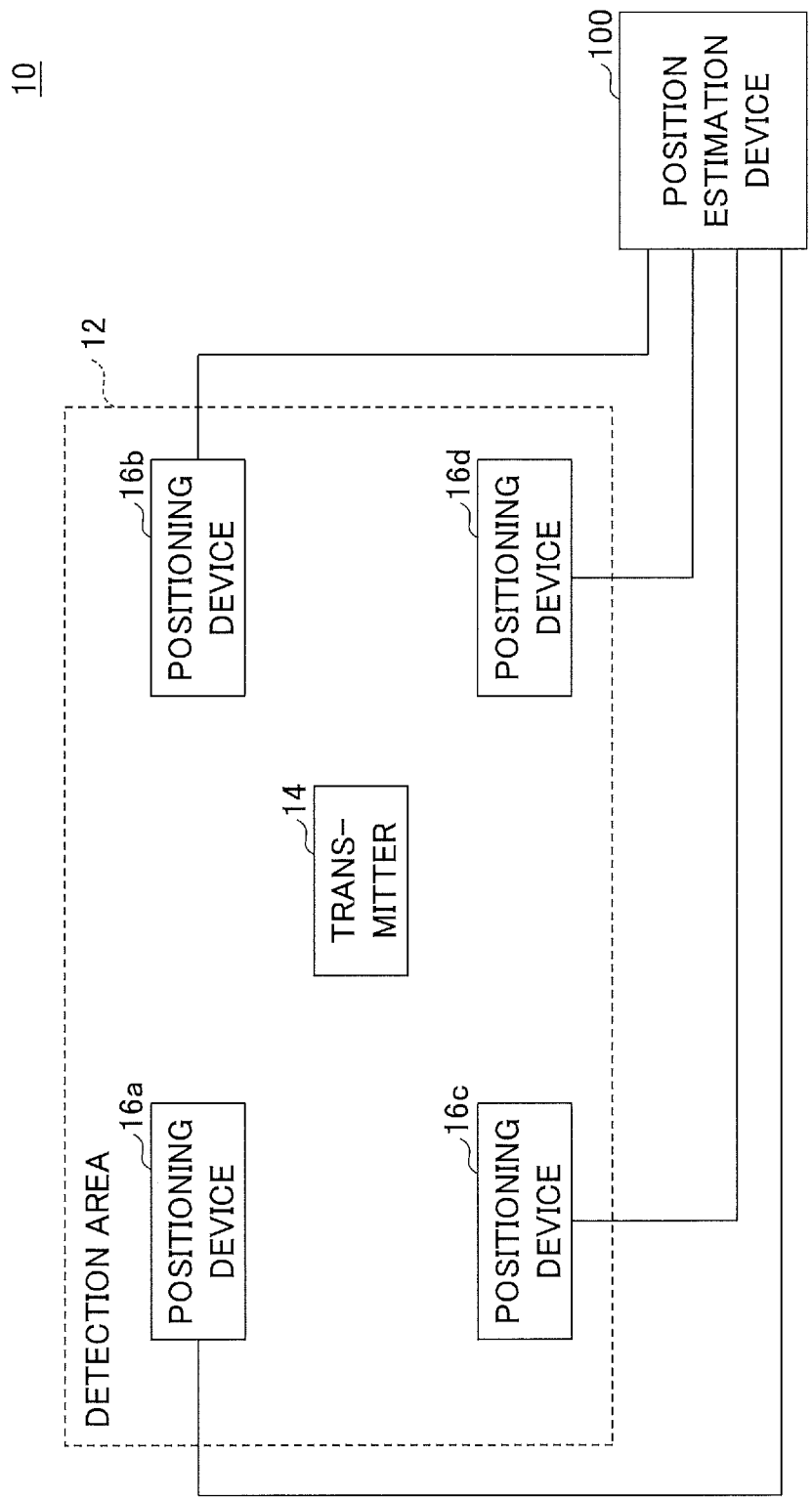
FIG. 1 is a drawing illustrating a system configuration of a position estimating system according to an embodiment.

FIG. 1 is a drawing illustrating a system configuration of a position estimating system 10 according to the embodiment. The position estimating system 10 illustrated in FIG. 1 is a system that can estimate a position of a transmitter 14 in a detection area 12. For example, the position estimating system 10 can form trajectory data indicating a movement trajectory of the transmitter 14 by continuously estimating the position of the transmitter 14.

As illustrated in FIG. 1, the position estimating system 10 includes the transmitter 14, multiple positioning devices 16 (positioning devices 16a to 16d), and a position estimating device 100.

The transmitter 14 is a device attached to an object to be positioned (e.g., a person, a robot, and a product) in the detection area 12. The transmitter 14 includes a transmitting antenna or the like, and can continuously transmit radio waves of a predetermined frequency toward a surrounding area of the transmitter 14 at predetermined intervals (e.g., 100-millisecond interval). As the transmitter 14, for example, a radio tag may be used.

The multiple positioning devices 16 are fixed and installed in the detection area 12. Each of the multiple positioning devices 16 includes a receiving antenna or the like, and can receive radio waves of the predetermined frequency transmitted from the transmitter 14. Each of the multiple positioning devices 16 can position a position of the transmitter 14 in the detection area 12 based on a result of receiving the radio waves of the predetermined frequency from the transmitter 14 (e.g., receiving direction and receiving intensity). Further, each of the multiple positioning devices 16 can output position data indicating the located position of the transmitter 14 (i.e., coordinate values). For example, each of the multiple positioning devices 16 continuously receives a radio wave continuously transmitted from the transmitter 14. Every time each of the multiple positioning devices 16 receives the radio wave transmitted from the transmitter 14, each of the multiple positioning devices 16 outputs position data of the transmitter 14 based on a result of receiving the radio wave. This enables each of the multiple positioning devices 16 to continuously output the position data of the transmitter 14.

The position estimating device 100 is communicatively connected to each of the multiple positioning devices 16. The position estimating device 100 obtains the position data output from each of the multiple positioning devices 16 and can estimate the position of the transmitter 14 based on the multiple position data. For example, the position estimating device 100 continuously obtains the position data continuously output from the multiple positioning devices 16. Every time the position estimating device 100 obtains the position data output from the multiple positioning devices 16, the position estimating device 100 estimates the position of the transmitter 14 based on the position data. This enables the position estimating device 100 to form trajectory data indicating a movement trajectory of the transmitter 14 by continuously estimating the position of the transmitter 14 and storing the estimated position of the transmitter 14. Various information processing devices (e.g., a personal computer and a server) may be used as the position estimating device 100.

(Functional Configuration of the Position Estimating Device 100)

Figure 2:
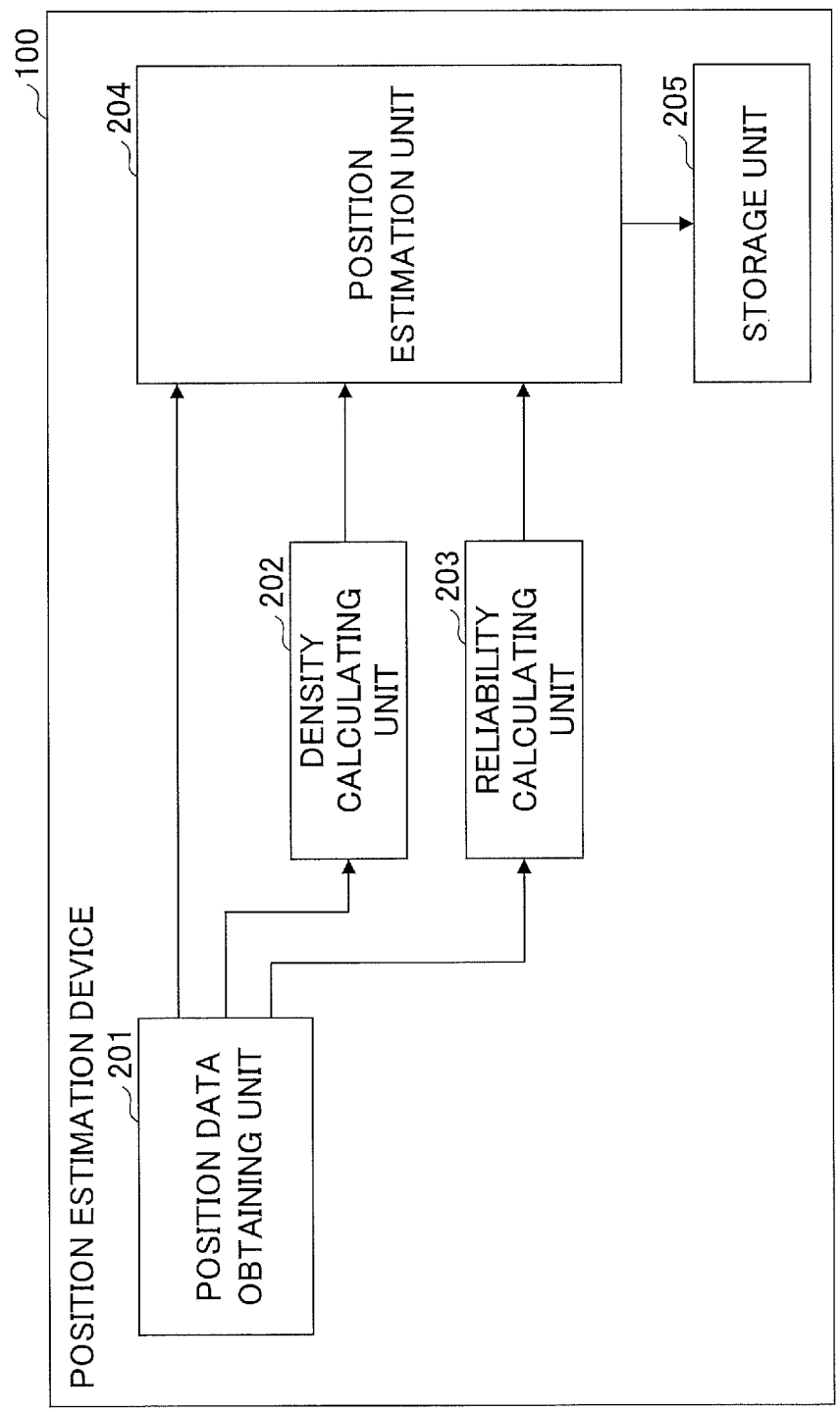
FIG. 2 is a block diagram illustrating a functional configuration of a position estimating device according to the embodiment.

FIG. 2 is a diagram illustrating a functional configuration of the position estimating device 100 according to the embodiment. As illustrated in FIG. 2, the position estimating device 100 includes a position data obtaining unit 201, a density calculating unit 202, a reliability calculating unit 203, a position estimating unit 204, and a storage unit 205.

The position data obtaining unit 201 obtains the position data of the transmitter 14 that is output from each of the multiple positioning devices 16.

The density calculating unit 202 calculates the density of the multiple position data based on the multiple position data output from the respective positioning devices 16 obtained by the position data obtaining unit 201. The "density" is a value indicating how close the multiple position data is.

For example, for each combination of two position data among the multiple position data output from the respective positioning devices 16, the density calculating unit 202 calculates a distance between two position data and calculates the sum of the distances calculated for respective combinations. The density calculating unit 202 calculates a higher density value as the calculated sum of distances decreases.

For example, the density calculating unit 202 obtains the number of position data included in a predetermined distance range among the multiple position data output from the respective positioning devices 16. The density calculating unit 202 calculates a higher density value as the number of position data included in the predetermined distance range increases. The details of a method of calculating the density by the density calculating unit 202 will be described later with reference to FIG. 4.

The reliability calculating unit 203 calculates the degree of reliability of each of the multiple position data output from the respective positioning devices 16 obtained by the position data obtaining unit 201. The "degree of reliability" is a value indicating the degree of reliability of each of the multiple position data.

For example, for each of the multiple position data output from the respective positioning devices 16, the reliability calculating unit 203 calculates a higher degree of reliability of the position data as a distance from a measurement position of the position data (i.e., a position of the positioning device 16 that measures the position data) to a position indicated by the position data (i.e., a located position of the transmitter 14) decreases.

For example, for each of the multiple position data output from the respective positioning devices 16, the reliability calculating unit 203 calculates a higher degree of reliability of the position data as the variation of the measurement accuracy of the positioning device 16 that measured the position data decreases.

For example, for each of the multiple position data output from the respective positioning devices 16, the reliability calculating unit 203 calculates a higher degree of reliability of the position data as a received signal strength indicator (RSSI) value obtained when the position data is measured increases.

For example, for each of the multiple position data output from the respective positioning devices 16, the reliability calculating unit 203 calculates a higher degree of reliability of the position data as a distance difference between the position indicated by the position data (i.e., the position of the transmitter 14) and a position indicated by the position data previously measured by the positioning device 16 that has measured the position data (i.e., the previous position of the transmitter 14) decreases. The method of calculating the degree of reliability at the reliability calculating unit 203 will be described later with reference to FIG. 5.

The position estimating unit 204 estimates the position of the transmitter 14 based on the multiple position data output from the respective positioning devices 16 obtained by the position data obtaining unit 201, the density calculated by the density calculation unit 202, and the degree of reliability calculated by the reliability calculation unit 203.

For example, when the density calculated by the density calculating unit 202 is above a first predetermined threshold value, the position estimating unit 204 estimates the position of the transmitter 14 based on the multiple position data output from the respective positioning devices 16. Specifically, when the density calculated by the density calculating unit 202 is above the first threshold value, the position estimating unit 204 calculates an average value of the multiple position data (i.e., coordinate values) of the multiple positioning devices 16 and determines a position indicated by the average value as the estimated position of the transmitter 14.

The storage unit 205 stores the position (i.e., the coordinate values) of the transmitter 14 estimated by the position estimating unit 204. For example, the storage unit 205 stores the position (i.e., the coordinate values) of the transmitter 14 estimated by the position estimating unit 204 in association with positioning time of the transmitter 14. This enables the storage unit 205 to form the trajectory data indicating a trajectory of the transmitter 14 in a time series.

When the density calculated by the density calculating unit 202 is below the first threshold value, the position estimating unit 204 estimates the position of the transmitter 14 based on the multiple position data output from the respective positioning devices 16 and the degree of reliability calculated by the reliability calculating unit 203. Specifically, when the density calculated by the density calculating unit 202 is below the first threshold value, the position estimating unit 204 selects one or more position data of which the degree of reliability calculated by the reliability calculating unit 203 is above a second predetermined threshold value from among the multiple position data output from the respective positioning devices 16, and estimates the position of the transmitter 14 based on the selected one or more position data. For example, when one position data is selected as the position data of which the degree of reliability is above the second threshold, the position estimating unit 204 determines a position indicated by the position data (i.e., the coordinate values) as the estimated position of the transmitter 14. For example, when multiple position data is selected as the position data of which the degree of reliability is above the second threshold, the position estimating unit 204 calculates an average value of the multiple position data (i.e., the coordinate values) and determines a position indicated by the average value as the estimated position of the transmitter 14.

Each function of the position estimating device 100 described above is achieved by, for example, a central processing unit (CPU) (i.e., an example of a "computer") executing a program stored in a memory (e.g., a read only memory (ROM) or a random access memory (RAM)) in the position estimating device 100. The program executed by the CPU may be provided in a state of being installed in the position estimating device 100 in advance, or may be provided from an external device and installed in the position estimating device 100. In the latter case, the program may be provided by an external storage medium (e.g., a USB memory, a memory card, and a CD-ROM) or may be provided by downloading from a server on a network (e.g., the Internet).

A part or entire of the above-described position estimating device 100 may be provided in a device other than the position estimating device 100. For example, a part or entire of the position estimating device 100 described above may be provided in the positioning device 16.

(Procedure of a Process Performed by the Position Estimating Device 100)

Figure 3:
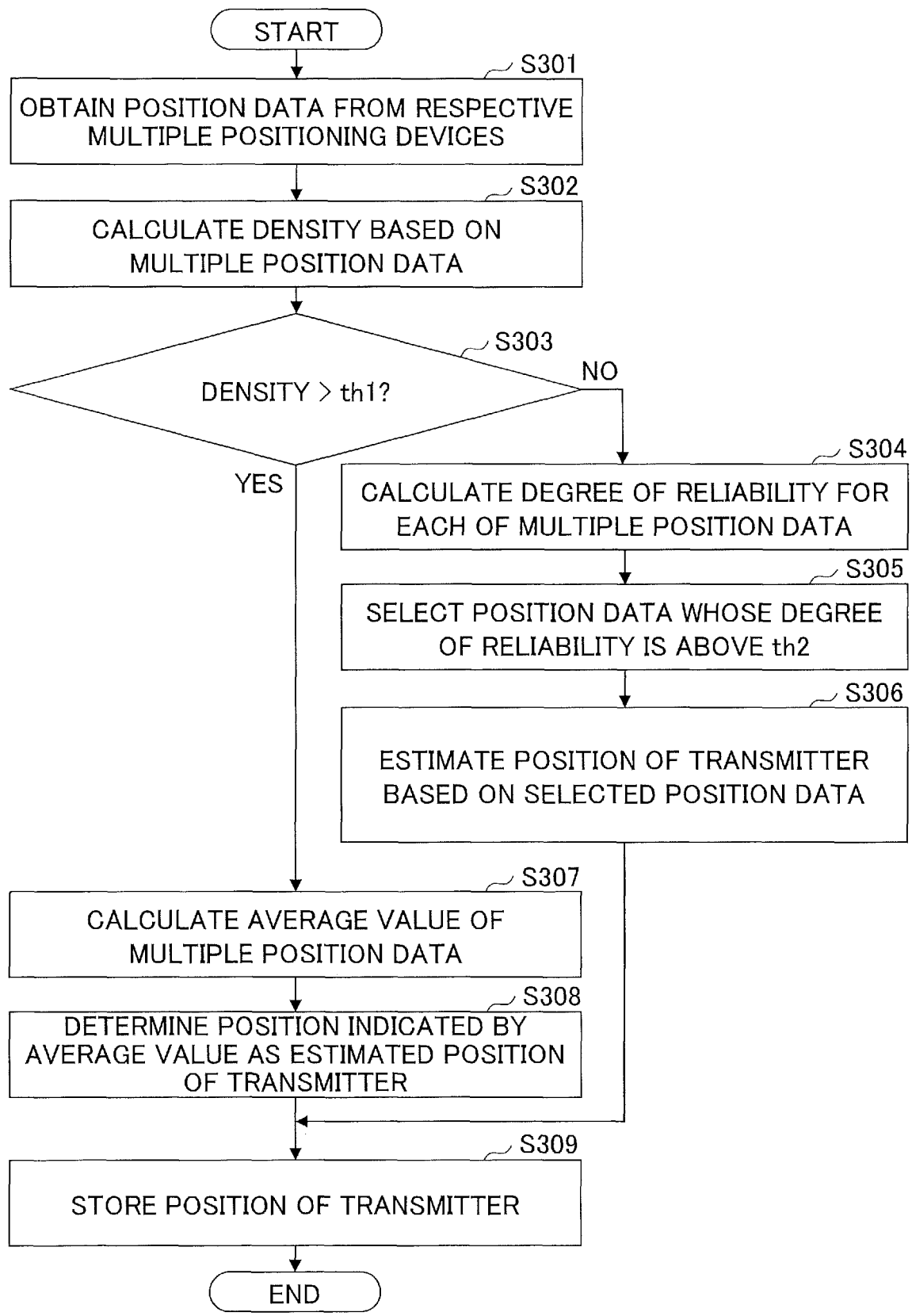
FIG. 3 is a flowchart illustrating a procedure of a process performed by the position estimating device according to the embodiment.

FIG. 3 is a flowchart illustrating a procedure of a process performed by the position estimating device 100 according to the embodiment. Here, a process performed for one reception of the position data output from each of the multiple positioning devices 16 in the position estimating device 100 will be described.

First, in step S301, the position data obtaining unit 201 obtains the position data of the transmitter 14 output from each of the multiple positioning devices 16. Next, in step S302, the density calculating unit 202 calculates the density of the multiple position data based on the multiple position data output from the respective positioning devices 16 obtained in step S301. In step S303, the position estimating unit 204 determines whether the density calculated in step S302 is higher than a predetermined threshold value th1.

In step S303, when the position estimating unit 204 has determined that the density calculated in step S302 is higher than the predetermined threshold value th1 (i.e., YES in step S303), in step S307, the position estimating unit 204 calculates an average value of the multiple position data (i.e., the coordinate values) of the multiple positioning devices 16 obtained in step S301. In step S308, the position estimating unit 204 determines a position indicated by the average value as the estimated position of the transmitter 14. In step S309, the storage unit 205 stores the position of the transmitter 14 estimated in step S308, and the position estimating device 100 ends a series of processing illustrated in FIG. 3.

In step S303, when the position estimating unit 204 has determined that the density calculated in step S302 is not higher than the predetermined threshold value th1 (i.e., NO in step S303), in step S304, the reliability calculating unit 203 calculates the degree of reliability for each of the multiple position data output from the respective positioning devices 16 obtained in step S301. In step S305, the position estimating unit 204 selects position data of which the degree of reliability calculated in step S304 is above a predetermined second threshold value th2 among the multiple position data output from the respective positioning devices 16 obtained in step S301.

In step S306, the position estimating unit 204 estimates the position of the transmitter 14 based on one or more position data selected in step S305. For example, when one position data is selected in step S305, the position estimating unit 204 determines a position indicated by the position data as the position of the transmitter 14. For example, when multiple position data is selected in step S305, the position estimating unit 204 calculates an average value of the multiple position data and determines a position indicated by the average value as the estimated position of the transmitter 14. In step S309, the storage unit 205 stores the position of the transmitter 14 estimated in step S306, and the position estimating device 100 ends a series of processing illustrated in FIG. 3.

The position estimating device 100 performs a series of processing illustrated in FIG. 3 every time the position data is output from the respective positioning devices 16. This enables the position estimating device 100 to continuously estimate the position of the transmitter 14. That is, this enables the position estimating device 100 to form trajectory data indicating a movement trajectory of the transmitter 14 in the detection area 12.

(Method of Calculating the Density at the Density Calculating Unit 202)

FIG. 4 is a drawing for describing a method of calculating the density at the density calculating unit 202 according to the embodiment.

FIG. 4 is a drawing illustrating the calculation items of the density at the density calculating unit 202. As illustrated in FIG. 4, the density calculating unit 202 calculates "the sum of distances between coordinates" and "the number of close points" as the calculation items of the density.

For example, for each combination of two position data in the multiple position data output from the respective positioning devices 16, the density calculating unit 202 calculates a distance between the two position data, and calculates the sum of the distances calculated for respective combinations. The density calculating unit 202 assigns the calculated sum of the distances as a score p1 (0 to 100). At this time, the density calculating unit 202 calculates a higher score p1 as the sum of distances decreases. The density calculating unit 202 calculates a value obtained by multiplying the score p1 by a predetermined weight value α1 as the "sum of distances between coordinates".

For example, the density calculating unit 202 calculates an average value $D_1$ of the sum of distances between a first position data (i.e., position data output from the positioning device 16a) and respective position data other than the first position data by using the following equation (1) where $d_{12}$ is a distance between the first position data and a second position data (i.e., position data output from the positioning device 16b), $d_{13}$ is a distance between the first position data and a third position data (i.e., position data output from the positioning device 16c), and $d_{14}$ is a distance between the first position data and a fourth position data (i.e., position data output from the positioning device 16d).

$$D_1=(d_{12}+d_{13}+d_{14})/3 \qquad (1)$$

For example, the density calculating unit 202 calculates an average value $D_2$ of the sum of the distances between the second position data and respective position data other than the second position data by using the following equation (2) where $d_{21}$ is a distance between the second position data and the first position data, $d_{23}$ is a distance between the second position data and the third position data, and $d_{24}$ is a distance between the second position data and the fourth position data.

$$D_2=(d_{21}+d_{23}+d_{24})/3 \qquad (2)$$

For example, the density calculating unit 202 calculates an average value $D_3$ of the sum of the distances between the third position data and respective position data other than the third position data by using the following equation (3) where $d_{31}$ is a distance between the third position data and the first position data, $d_{32}$ is a distance between the third position data and the second position data, and $d_{34}$ is a distance between the third position data and the fourth position data.

$$D_3=(d_{31}+d_{32}+d_{34})/3 \qquad (3)$$

For example, the density calculating unit 202 calculates an average value $D_4$ of the sum of the distances between the fourth position data and respective position data other than the fourth position data by using the following equation (4) where $d_{41}$ is a distance between the fourth position data and the first position data, $d_{42}$ is a distance between the fourth position data and the second position data, and $d_{43}$ is a distance between the fourth position data and the third position data.

$$D_4=(d_{41}+d_{42}+d_{43})/3 \qquad (4)$$

For example, the density calculating unit 202 calculates the score p1 by using the following equation (5) where D is an average value of $D_1$, $D_2$, $D_3$, and $D_4$ calculated above (i.e., $(D_1+D_2+D_3+D_4)/4$). The equation (5) is defined to be p1=0 when D=3000 and p1=100 when D=0.

$$p1=100-(100/3000)\times D \qquad (5)$$

For example, the density calculating unit 202 obtains the number of position data included in the predetermined distance range among the multiple position data output from the respective positioning devices 16. The density calculating unit 202 assigns the obtained number of position data included within the determined predetermined distance range as a score p2 (0 to 100). At this time, the density calculating unit 202 calculates a higher score p2 as the number of the position data included in the predetermined distance range increases.

For example, the density calculating unit 202 calculates the score p2 by using the following equation (6) when the number of the multiple position data output from the respective positioning devices 16 is set to "4" and the number of the position data included in the predetermined distance range is set to N.

$$p2=(100/4)\times N \qquad (6)$$

The density calculating unit 202 calculates a value obtained by multiplying the score p2 by a predetermined weight value α2 as the "number of close points".

The density calculating unit 202 calculates a density S by using the following equation (7) based on the "sum of distances between coordinates" and the "number of close points" as calculated above.

$$S=(p1\times\alpha 1)+(p2\times\alpha 2) \qquad (7)$$

Appropriate values are set as the "predetermined weight value α1", the "predetermined weight value α2," and the "predetermined distance range" described above in advance and are stored in the memory of the position estimating device 100 so as to be able to appropriately determine whether multiple position data are close.

(Method of Calculating the Degree of Reliability at the Reliability Calculating Unit 203)

FIG. 5 is a drawing for describing a method of calculating the degree of reliability at a reliability calculating unit 203 according to the embodiment.

FIG. 5 is a drawing illustrating calculation items of the degree of reliability at the reliability calculating unit 203. As illustrated in FIG. 5, the reliability calculating unit 203 calculates a "measurement distance," a "variation of measurement accuracy," a "RSSI value," and a "distance difference from a previous coordinate" as the calculation items of the degree of reliability.

For example, for each of the multiple position data output from the respective positioning devices 16, the reliability calculating unit 203 assigns a distance from the measurement position of the position data (i.e., the position of the positioning device 16 that has measured the position data) to the position indicated by the position data (i.e., the position of the transmitter 14) as a score p3 (0 to 100). At this time, the reliability calculating unit 203 calculates a higher score p3 as the distance decreases. The reliability calculating unit 203 calculates a value obtained by multiplying the score p3 by a predetermined weight value α3 as a "measurement distance". The position of the positioning device 16 can be obtained with the position data output from each positioning device 16, for example.

For example, for each of the multiple position data output from the respective positioning devices 16, the reliability calculating unit 203 calculates the variation of the measurement accuracy of the positioning device 16 that has measured the position data. For example, the reliability calculating unit 203 can calculate the variation of the measurement accuracy of each positioning device 16 based on multiple position data positioned by the positioning device 16 in the past. Thus, the reliability calculating unit 203 needs to store multiple position data positioned by the multiple positioning devices 16 in the past in the memory of the position estimating device 100, for example. The reliability calculating unit 203 assigns the calculated variation of the measurement accuracy as a score p4 (0 to 100). At this time, the reliability calculating unit 203 calculates a higher score p4 as the variation decreases. The reliability calculating unit 203 calculates a value obtained by multiplying the score p4 by a predetermined weight value α4 as a "variation of the measurement accuracy".

For example, for each of the multiple position data output from the respective positioning devices 16, the reliability calculating unit 203 assigns an RSSI value obtained when the position data has been measured as a score p5 (0 to 100). At this time, the reliability calculating unit 203 calculates a higher score p5 as the RSSI value increases. The reliability calculating unit 203 calculates a value obtained by multiplying the score p5 by a predetermined weight value α5 as an "RSSI value". The RSSI value can be obtained with the position data output from each positioning device 16, for example.

For example, for each of the multiple position data output from the respective positioning devices 16, the reliability calculating unit 203 assigns a distance difference between the position indicated by the position data (i.e., the position of the transmitter 14) and the position indicated by the previous position data of the positioning device 16 that has measured the position data (i.e., the previous position of the transmitter 14) as a score p6 (0 to 100). At this time, the reliability calculating unit 203 calculates a higher score p6 as the distance difference decreases. The reliability calculating unit 203 calculates a value obtained by multiplying the score p6 by a predetermined weight value α6 as a "distance difference from a previous coordinate".

The reliability calculating unit 203 calculates the degree of reliability Q by using the following equation (8) based on the "measurement distance", the "variation of the measurement accuracy", the "RSSI value", and the "distance difference from the previous coordinate" calculated above.

$$Q=(p3\times\alpha4)+(p4\times\alpha4)+(p5\times\alpha5)+(p6\times\alpha6) \quad (8)$$

Appropriate value are set as the "predetermined weight value α3", the "predetermined weight value α4", the "predetermined weight value α5", and the "predetermined weight value α6" described above in advance and are stored in advance in the memory of the position estimating device 100 so as to be able to appropriately determine whether each of the multiple position data is reliable.

Example

Figure 6:
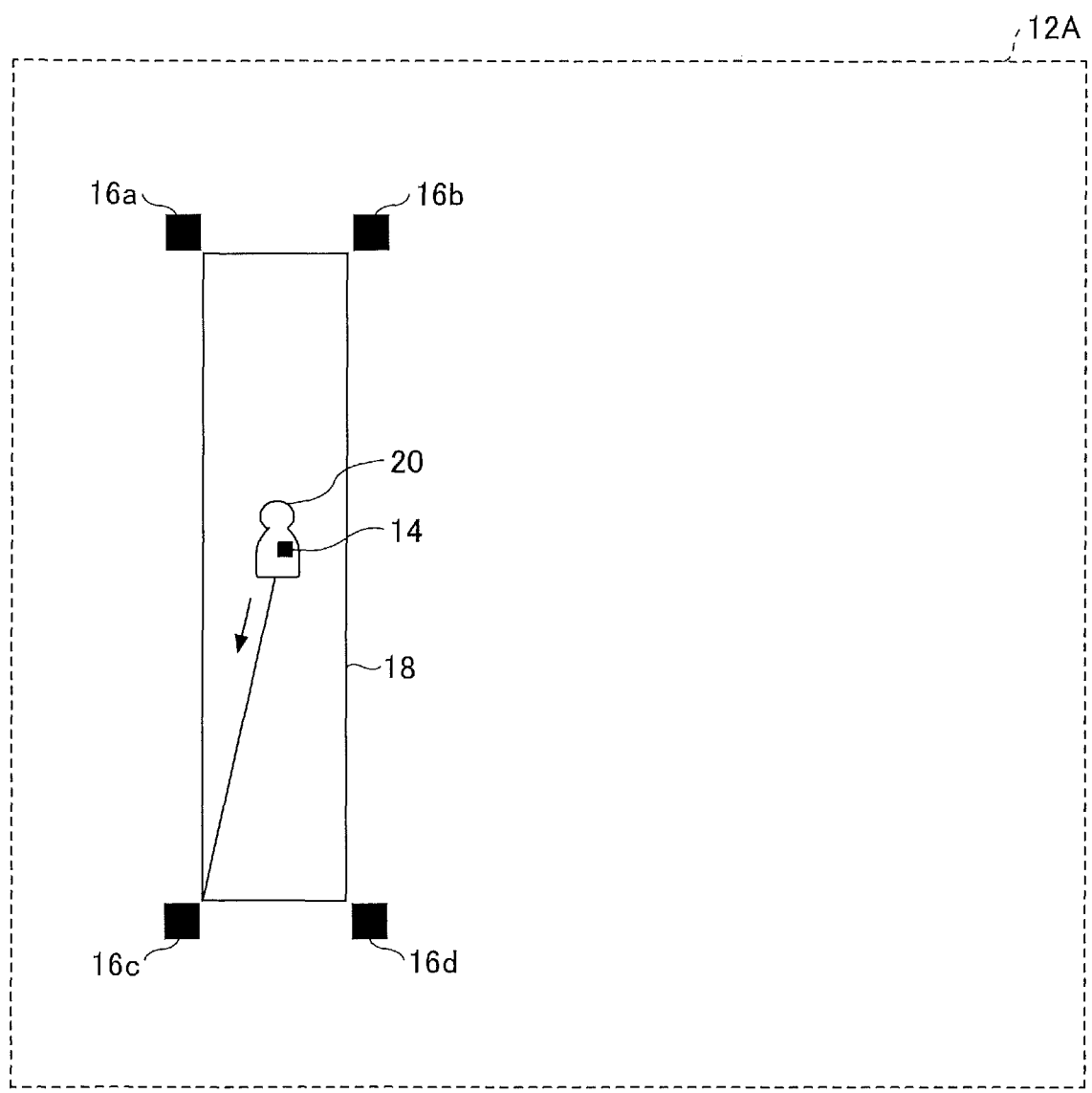
FIG. 6 is a drawing illustrating a movement route of an object to be positioned used in an example of the position estimating system according to the embodiment.

Next, an example of the position estimating system 10 according to the embodiment will be described with reference to FIG. 6 and FIG. 7. FIG. 6 is a drawing illustrating a movement route 18 of an object to be positioned 20 used in the example of the position estimating system according to the embodiment. In the present embodiment, as illustrated in FIG. 6, multiple positioning devices 16 (i.e., positioning devices 16a to 16d) are disposed in the detection area 12A. The movement route 18 has been set in the detection area 12A, and the object to be positioned 20 (i.e., a person) has been moved along the movement route 18. At this time, each of the multiple positioning devices 16 receives the radio wave from the transmitter 14 (i.e., the radio tag) attached to the object to be positioned 20 and positions the position of the transmitter 14 based on a result of receiving the radio wave.

(Result of Positioning the Position of Transmitter 14 by Using Multiple Positioning Devices 16)

Figure 7:
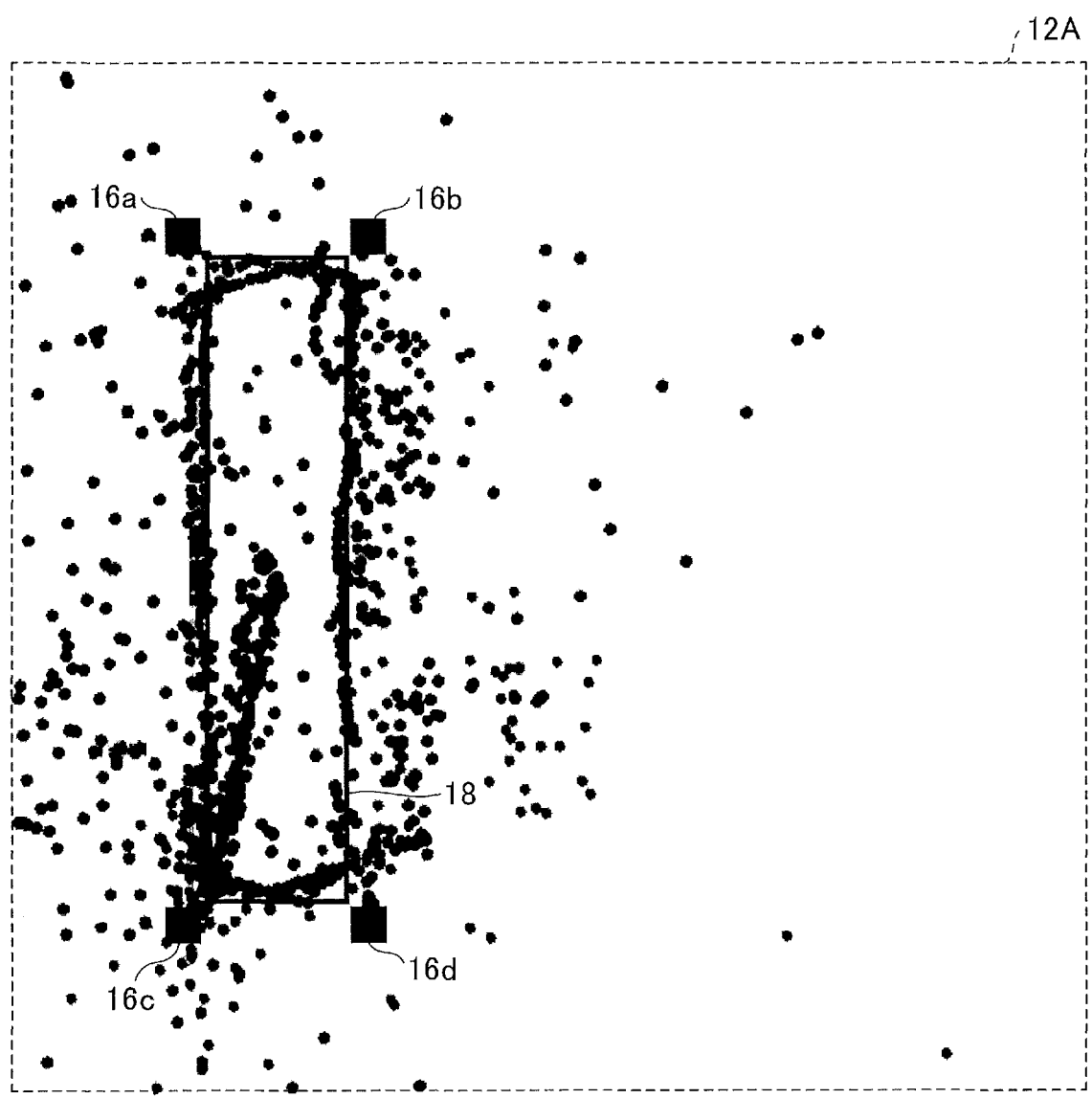
FIG. 7 is a drawing illustrating a position of a transmitter positioned by multiple positioning devices in the example of the position estimating system according to the embodiment.

FIG. 7 is a drawing illustrating the position of the transmitter 14 positioned by multiple positioning devices 16 in the example of the position estimating system according to the embodiment. FIG. 7 plots the positions of the transmitter 14 positioned by the multiple positioning devices 16 on the detection area 12A when the object to be positioned 20 has moved along the movement route 18.

As illustrated in FIG. 7, the positions of the transmitter 14 positioned by the multiple positioning devices 16 include many positions that are not on the movement route 18. That is, there is some variation between the actual positions of the transmitter 14 and the estimated positions. The variation may be caused because noise has superimposed on the radio waves transmitted from the transmitter 14, or a status of receiving the radio waves transmitted from the transmitter 14 has deteriorated, for example.

(Result of Estimating the Position of the Transmitter 14 by Using the Position Estimating Device 100)

Figure 8:
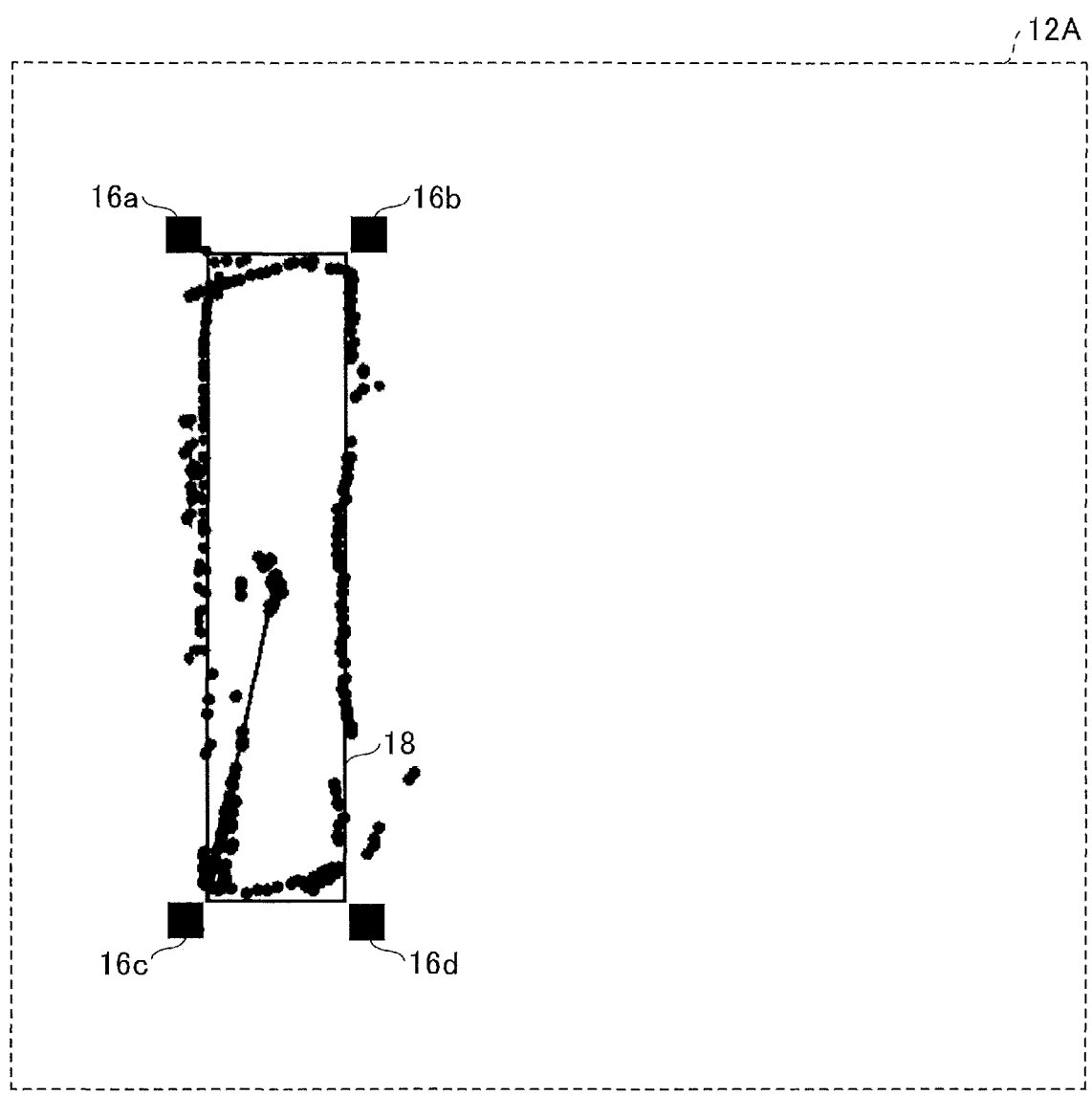
FIG. 8 is a drawing illustrating a position of a transmitter estimated by the position estimating device in the example of the position estimating system according to the embodiment.

FIG. 8 is a drawing illustrating the position of the transmitter 14 estimated by the position estimating device 100 in the example of the position estimating system 10 according to the embodiment. FIG. 8 plots the positions of the transmitter 14, which have been estimated by the position estimating device 100 based on the position data of the transmitter 14 used in FIG. 7, on the detection area 12A.

As illustrated in FIG. 8, almost all of the positions of the transmitter 14 estimated by the position estimating device 100 are on the movement route 18. That is, the positions of the transmitter 14 estimated by the position estimating device 100 can be considered as highly accurate position data.

According to the present embodiment, the position estimating device 100 employs a configuration in which the position of the transmitter 14 is estimated based on multiple position data output from the respective positioning devices 16, the density calculated by the density calculating unit 202, and the degree of reliability calculated by the reliability calculating unit 203. Thus, the position estimating device 100 can estimate the position of the transmitter 14 by using relatively highly accurate position data (i.e., high-density position data and high-reliability position data) Therefore, according to the position estimating device 100, even when a variation is generated in the positions of the transmitter 14 positioned by the multiple positioning devices 16, the position of the object to be positioned 20 can be estimated with high accuracy.

The embodiment of the invention has been described in detail above, the invention is not limited to the embodiment, and various modifications or alterations can be made within the scope of the invention as recited in the claims.

For example, in the above-described embodiment, a validity determining unit may be further provided to determine the multiple position data output from the respective positioning devices 16 as valid data when the density calculated by the density calculating unit 202 is above the first threshold value th1, and determine the multiple position data output from the respective positioning devices 16 as invalid data when the density calculated by the density calculating unit 202 is below the first threshold value th1. In this case, when the validity determining unit has determined that multiple position data output from the respective positioning devices 16 is valid, the position estimating unit 204 preferably estimates the position of the transmitter 14 based on the multiple position data. Additionally, in this case, when the validity determining unit has determined that multiple position data output from the respective positioning devices 16 is not valid, the position estimating unit 204 may discard the multiple position data.

For example, in the above-described embodiment, the position data is obtained from four positioning devices 16 disposed in the detection area 12. However, the embodiment is not limited to this. For example, the position data may be obtained from three, five, or more positioning devices 16 disposed in the detection area 12.

For example, in the above-described embodiment, the position of transmitter 14 is estimated based on the density and the degree of reliability. However, the embodiment is not limited to this. For example, the position of transmitter 14 may be estimated based on either the density or the degree of reliability.

What is claimed is:

1. A position estimating device comprising
   a processor, and a memory storing program instructions that cause the processor to obtain a plurality of position data of a transmitter, the plurality of position data being output from respective positioning devices, calculate a density of the plurality of position data based on the plurality of obtained position data output from the respective positioning devices, the density of the plurality of position data being a value indicating how close positions indicated by the plurality of position data are to each other, estimate a position of the transmitter based on the plurality of obtained position data output from the respective positioning devices and the calculated density when the calculated density is above a predetermined first threshold, calculate a degree of reliability of each of the plurality of position data output from the respective positioning devices, and estimate the position of the transmitter based on the plurality of position data output from the respective positioning devices and the calculated degree of reliability of each of the plurality of position data when the calculated density is below the predetermined first threshold.

2. The position estimating device as claimed in claim 1, wherein the program instructions further cause the processor to determine a position indicated by an average value of the plurality of position data output from the respective positioning devices as the estimated position of the transmitter when the calculated density is above the predetermined first threshold.

3. The position estimating device as claimed in claim 1, wherein for each combination of two position data among the plurality of position data output from the respective positioning devices, the program instructions further cause the processor to calculate a distance between the two position data, and calculate a higher density as a sum of the distance calculated for each combination decreases.

4. The position estimating device as claimed in claim 1, wherein the program instructions further cause the processor to select position data included within a predetermined distance range among the plurality of position data output from the respective positioning devices, and calculate a higher density as a number of position data included within the predetermined distance range increases.

5. The position estimating device as claimed in claim 1, wherein the program instructions further cause the processor to estimate the position of the transmitter based on position data of which the calculated degree of reliability is above a predetermined second threshold among the plurality of position data output from the respective positioning devices, when the calculated density is below the predetermined first threshold.

6. The position estimating device as claimed in claim 1, wherein for each of the plurality of position data output from the respective positioning devices, the program instructions further cause the processor to calculate a higher degree of reliability of a given position data as a distance from a measurement position of the given position data to a position indicated by the given position data decreases.

7. The position estimating device as claimed in claim 1, wherein for each of the plurality of position data output from the respective positioning devices, the program instructions further cause the processor to calculate a higher degree of reliability of a given position data as a variation of measurement accuracy of a positioning device that has measured the given position data decreases.

8. The position estimating device as claimed in claim 1, wherein for each of the plurality of position data output from the respective positioning devices, the program instructions further cause the processor to calculate a higher degree of reliability of a given position data as a received signal strength indicator value obtained when the given position data is measured increases.

9. The position estimating device as claimed in claim 1, wherein for each of the plurality of position data output from the respective positioning devices, the program instructions further cause the processor to calculate a higher degree of reliability of a given position data as a distance difference between a position indicated by the given position data and a position indicated by position data previously obtained by a positioning device that has measured the given position data decreases.

10. The position estimating device as claimed in claim 1, wherein the program instructions further cause the processor to determine that the plurality of position data output from the respective positioning devices is valid when the calculated density is above the first threshold, and determine that the plurality of position data output from the respective positioning devices is invalid when the calculated density is below the first threshold, and wherein the program instructions cause the processor to estimate the position of the transmitter based on the plurality of position data when the processor has determined that the plurality of position data output from the respective positioning devices is valid.

11. A position estimating system comprising
a transmitter;
a plurality of positioning devices; and
the position estimating device as claimed in claim 1.

12. A position estimating method comprising:
obtaining a plurality of position data of a transmitter, the plurality of position data being output from respective positioning devices;

calculating a density of the plurality of position data based on the plurality of position data output from the respective positioning devices obtained by the obtaining, the density of the plurality of position data being a value indicating how close positions indicated by the plurality of position data are to each other;

estimating a position of the transmitter based on the plurality of position data output from the respective positioning devices and the density calculated by the calculating when the calculated density is above a predetermined first threshold;

calculating a degree of reliability of each of the plurality of position data output from the respective positioning devices; and estimating the position of the transmitter based on the plurality of position data output from the respective positioning devices and the calculated degree of reliability of each of the plurality of position data when the calculated density is below the predetermined first threshold.

13. A non-transitory computer-readable recording medium having stored therein a program for causing a computer to execute a process comprising:

obtaining a plurality of position data of a transmitter, the plurality of position data being output from respective positioning devices;

calculating a density of the plurality of position data based on the plurality of position data output from the respective positioning devices obtained by the obtaining, the density of the plurality of position data being a value indicating how close positions indicated by the plurality of position data are to each other;

estimating a position of the transmitter based on the plurality of position data output from the respective positioning devices and the density calculated by the calculating when the calculated density is above a predetermined first threshold;

calculating a degree of reliability of each of the plurality of position data output from the respective positioning devices; and estimating the position of the transmitter based on the plurality of position data output from the respective positioning devices and the calculated degree of reliability of each of the plurality of position data when the calculated density is below the predetermined first threshold.

* * * * *